United States Patent [19]
Morgan et al.

[11] Patent Number: 5,218,672
[45] Date of Patent: Jun. 8, 1993

[54] OFFLINE EDITING SYSTEM WITH USER INTERFACE FOR CONTROLLING EDIT LIST GENERATION

[75] Inventors: Donald E. Morgan, Saratoga; Ted Langford, Fremont; Andrew Leary, Mountain View; Dave Wheeler, Palo Alto; Jon Graham, San Jose; Doug Kuper, Campbell, all of Calif.

[73] Assignee: Sony Corporation of America, Park Ridge, N.J.

[21] Appl. No.: 467,160

[22] Filed: Jan. 19, 1990

[51] Int. Cl.5 ............................................ G06F 15/20
[52] U.S. Cl. ................................. 395/162; 395/164; 360/14.1; 360/14.3; 358/342
[58] Field of Search ............... 395/162, 163, 164, 325; 360/14.1, 14.3; 358/342

[56] References Cited

U.S. PATENT DOCUMENTS

| | | | |
|---|---|---|---|
| 3,721,757 | 3/1973 | Ettlinger . | |
| 4,100,607 | 7/1978 | Skinner | 360/14.2 |
| 4,272,790 | 6/1981 | Bates | 360/14.1 |
| 4,449,198 | 5/1984 | Kroon et al. | 358/342 |
| 4,521,870 | 6/1985 | Babbel et al. | 395/325 |
| 4,538,188 | 8/1985 | Barker et al. | 360/14.3 |
| 4,591,931 | 5/1986 | Baumeister | 360/14.3 |
| 4,600,989 | 7/1986 | Schwartz et al. | 360/14.3 |
| 4,612,569 | 9/1986 | Ichinose | 360/14.1 |
| 4,660,101 | 5/1987 | Martin | 358/342 |
| 4,675,755 | 6/1987 | Baumeister et al. | 360/35.1 |
| 4,685,001 | 8/1987 | Martin | 358/342 |
| 4,685,003 | 8/1987 | Westland | 360/33.1 |
| 4,709,277 | 11/1987 | Ninomiya et al. | 360/14.3 |
| 4,717,971 | 1/1988 | Sawyer | 358/342 |
| 4,746,994 | 5/1988 | Ettlinger | 360/14.1 |
| 4,754,342 | 6/1988 | Duffy | 360/14.1 |
| 4,855,842 | 8/1989 | Hayes et al. | 358/342 |
| 4,868,687 | 9/1989 | Penn et al. | 360/14.1 |

FOREIGN PATENT DOCUMENTS

0240794A2 10/1987 European Pat. Off. .
0268270A3 5/1988 European Pat. Off. .
0338753A3 10/1989 European Pat. Off. .

OTHER PUBLICATIONS

Tom Mann, "Non-Linear Off-Line Editing for HDTV and Film," Image Technology, Dec. 1989, pp. 541-546.
Jeffrey Borish, et al., "Sound Droid: A New Approach to Digital Editing and Mixing of Sound," The BKSTS Journal, Jul. 1985, pp. 412-417.
Conversation with Larry Seehorn, "The Midas Touch", Videography journal, May 1989, pp. 78-80.
Seehorn Technologies Inc., "Midas II", nine-page brochure, Oct. 1989.
"CMX 6000 Random-Access Editing System", five-page brochure, Mar. 1987.
"Editdroid—The Editing System of Choice", six-page brochure, 1985.
"The Link Editing System", seven-page brochure, Oct. 1988.
"Avid/1 Media Composer—Product Description", two-page brochure, Apr. 1989.

Primary Examiner—Dale M. Shaw
Assistant Examiner—Kee M. Tung
Attorney, Agency, or Firm—Limbach & Limbach

[57] ABSTRACT

A post production offline editing system for storing unedited video takes in a random access memory (which is preferably a set of laser video disk players), displaying selected takes (or individual frames from selected takes), and generating an edit list which defines an edited video program. The system includes a computer programmed with software providing an integrated software environment which enables a user conveniently to log unedited takes into the system, and to generate an edit list suitable for use in a subsequent online editing operation. The system software provides global access to a variety of video post production environments at any point during an offline editing operation. The system software presents menus to the user including icons or mnemonic text in windows which may be conveniently selected by the user using a mouse. In a preferred embodiment, the invention includes a video special effects unit capable of processing the stored takes to simulate various video transitions between scenes (such as dissolves, fades, and wipes), to enable the user to view a show defined by an edit list which specifies such transitions. The user interface includes a convenient means for jogging (and shuttling) the laser disk players using a mouse.

12 Claims, 13 Drawing Sheets

OFF-LINE WORK STATION
AUDIO CONNECTION DIAGRAM

OFFLINE EDITING SYSTEM WITH USER INTERFACE FOR CONTROLLING EDIT LIST GENERATION

FIELD OF THE INVENTION

The invention is a post production editing system which includes means for storing unedited video takes in a random access memory, displaying selected takes (or individual frames from selected takes), and generating an edit list which defines an edited video program. In a preferred embodiment, the unedited video takes are stored in one or more laser video disks, and the invention includes a computer programmed to display menus prompting a user to perform desired editing operations.

BACKGROUND OF THE INVENTION

Post production editing of film and video works may be efficiently accomplished using offline and online editing systems. Offline editing systems generate an edit list by manipulating unedited takes that have been stored in video tape or laser video disk format (i.e., motion picture film takes that have been transferred to video tape or video disk), and stored addresses (time codes) identifying the first and last frame of each take. The edit list specifies a sequence of selected takes (with transitions between the takes), which may subsequently be used by an online editing system to generate an edited master film (or tape) from the originally produced medium (i.e., motion picture film).

Post production offline editing systems have been proposed which include means for storing unedited video takes and addresses (on video tape or laser video disks), and computer means for controlling the display of selected unedited video takes (or frames of such takes) and generating the edit list in response to user-entered commands.

Throughout this specification, the noun "edit" shall be used (with reference to video signals) to denote one or more consecutive video frames which correspond to all or part of a scene or take. With reference to audio signals, the noun "edit" shall be used to denote a left or right channel of an audio soundtrack which corresponds to a video edit. The noun "splice" shall be used to denote the transition between two edits, and the noun "show" (or "video program" or "audio program") shall be used to denote a sequence of edits and splices.

A "splice" may be a simple cut, in which the end (i.e., the last frame) of a first edit is concatenated with the beginning (i.e., first frame) of a second edit. Alternatively, a splice (whether video or audio) may be a more complicated transition, such as a wipe, fade, or dissolve. For example, a show may consist of a first edit, followed by a simple cut to a second edit, followed by a dissolve splice to a third edit. Typically, a show will include a video portion, as well as left and right channels of an audio soundtrack.

Sometimes in the specification, the terms "left" and "right" edits will be used respectively to denote earlier and later edits. Used in this sense, for example, when a viewer views a show in its normal time sequence (i.e., not in a reversed sequence), the viewer will see the left edit before the right edit.

Several systems have been proposed for post production offline editing. For example, U.S. Pat. No. 4,746,994 (issued May 24, 1988, to Ettlinger) discloses a computer-based video editing system in which unedited takes are stored on video tape recorders (although the reference also includes a very general suggestion that video disk players may be substituted for the video tape recorders). A computer system enables the user to control the video tape recorders and generate an edit list. The computer system displays a sequence of menus which prompt the user to perform various editing operations (such as displaying desired frames of the unedited takes, shuttling frame-by-frame through a stored unedited take, adding edits to an edit list, and playing back the sequence of takes defined by the edit list). The user may select various ones of the editing operations by actuating a light pen.

For another example, U.S. Pat. No. 4,754,342 issued Jun. 28, 1988, to Duffy) discloses a computer-based video editing system in which unedited takes are stored on video disk players. After generating an edit list, the user may command the system to electronically splice takes in accordance with the edit list and play back the edited show. By using a control console 50 with a control buttons 100 through 112 and a dial 114, the user may command the system to display individual frames of the stored takes, or "roll" one or more takes (or an edited sequence of takes) in forward or reverse motion, at any of a variety of speeds.

However, use of light pens (as in U.S. Pat. No. 4,746,994) is cumbersome and distracts the user's attention from the editing operation, and use of dials and buttons as disclosed in U.S. Pat. No. 4,754,342 is also cumbersome as the dials and buttons perform only a limited number of functions, necessitating use of a computer keyboard to perform other essential post production editing functions. Furthermore, until the present invention, it had not been known how to provide global access to a variety of video post production environments (i.e., computer menus for scene logging, edit list modification, replay of an edited show, and the like) at any point during an post production offline editing operation, and it had not been known how to design user interface software to accomplish this function using convenient icons which may be selected by the use using a mouse-type input device.

SUMMARY OF THE INVENTION

The invention is a post production offline editing system which includes means for storing unedited video takes in a random access memory (preferably a set of laser video disk players), displaying selected takes (or individual frames from selected takes), and generating an edit list which defines an edited video program. The system of the invention includes a computer programmed with software providing an integrated software environment which enables a user conveniently to log unedited takes into the system, and to generate an edit list suitable for use in a subsequent online editing operation. The system software provides global access to a variety of video post production environments (i.e., computer menus prompting the user to perform a variety of operations, such as logging of unedited takes onto the system, edit list modification, and playback of an edited show) at any point during an offline editing operation. The system software presents menus to the user including icons (and mnemonic text) within windows which may conveniently be selected by the user using a mouse.

The system components are preferably arranged to that a user may conveniently view a set of video monitors, thus focusing his or her attention on the video frames being displayed on the monitors, while manipulating the mouse to enter edit decisions into the system.

In a preferred embodiment, the invention includes a video special effects unit capable of processing the stored takes to simulate various video transitions between scenes (such as dissolves, fades, and wipes), to enable the user to view a show defined by an edit list which specifies such transitions.

The user interface includes a convenient means for jogging (and shuttling) the laser disk players using a mouse. After selecting a special jog/shuttle window (identified by an icon or mnemonic text), the user actuates certain buttons on the mouse to enter a mode in which rightward motion of the mouse commands the appropriate video disk player to shuttle a disk player in a forward direction, and leftward motion of the mouse commands the video disk player to shuttle in the reverse direction.

DETAILED DESCRIPTION OF THE PREFERRED EMBODIMENT

Figure 1:
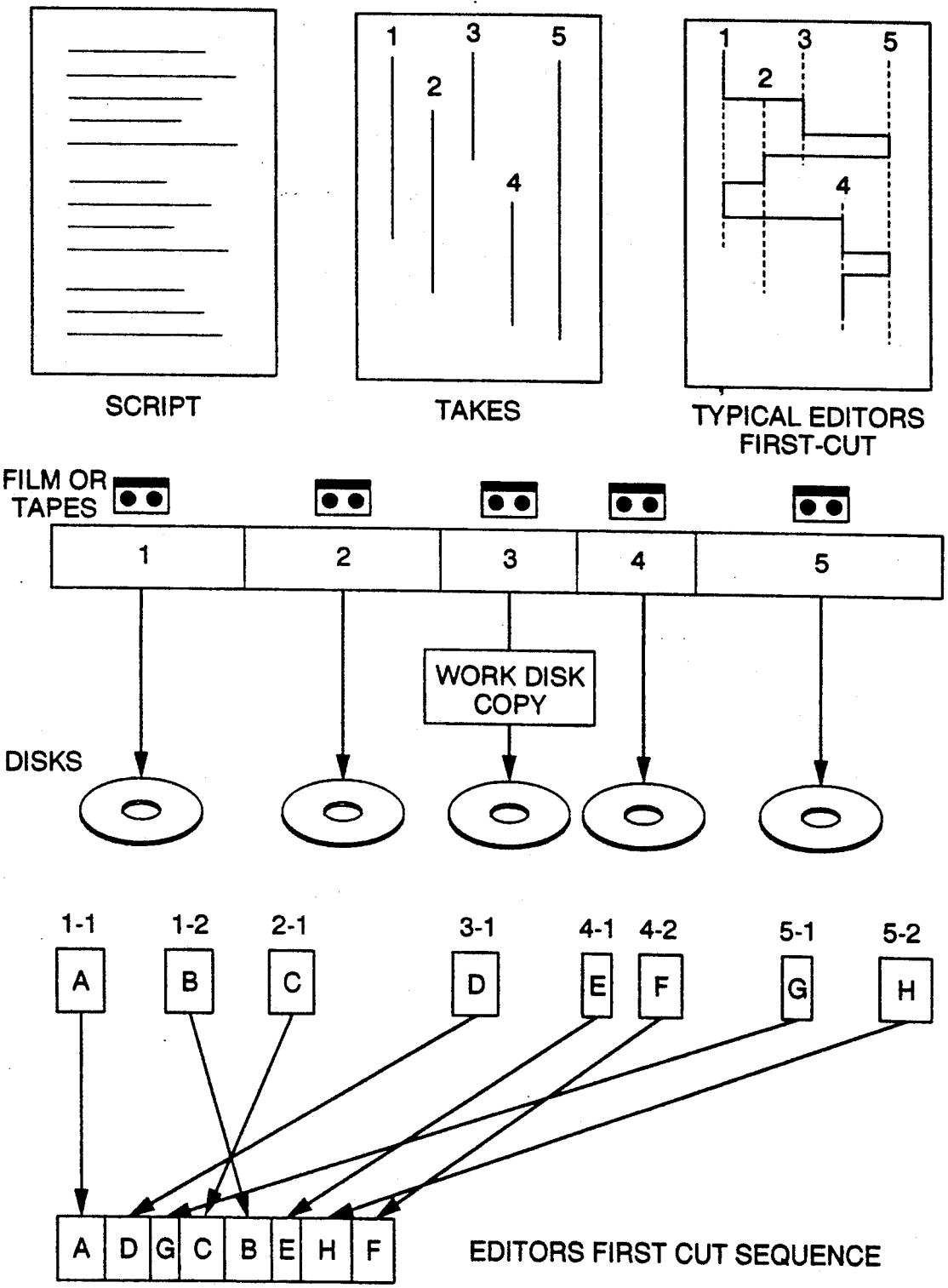
FIG. 1 is a schematic diagram representing the steps performed during post production offline editing.

FIG. 1 is a schematic diagram representing the steps performed during post production offline editing. FIG. 1 contemplates that during production, the production crew has prepared five video tapes (or strips of motion picture film), each representing a take. Each take corresponds to a portion of a script. The takes are sometimes collectively referred to as "dailies," and are the raw material for the post-production editing process.

Each tape (or segment of motion picture film) is transferred to a laser video disk (or disks), so that the disks may be inserted into the video disk playback units of the invention. During offline editing, the editor may generate an edit list which characterizes the typical "first-cut" shown in the upper right corner of FIG. 1. This first cut consists of concatenated portions of each of the five takes, which define an edited show.

More specifically, during offline editing the editor identifies group "A" of frames from the first disk as the first "edit" on the list. The editor then identifies group "B" of frames from the first disk as the second edit, group "C" of frames from the second disk as the third edit, group "D" of frames from the third disk as the fourth edit, group "E" of frames from the fourth disk as the fifth edit, group "F" of frames from the fourth disk as the sixth edit, group "G" of frames from the fifth disk as the seventh edit, and group "H" of frames from the fifth disk as the eighth edit.

Of course, the editor may choose to revise the initial edit list. For example, the editor may decide that the first splice (the transition between the last frame of edit "A" and the first frame of edit "B") should be a wipe (or a dissolve), rather than a simple cut. The editor would accordingly supplement the edit list to include this "splice" information.

Figure 2:
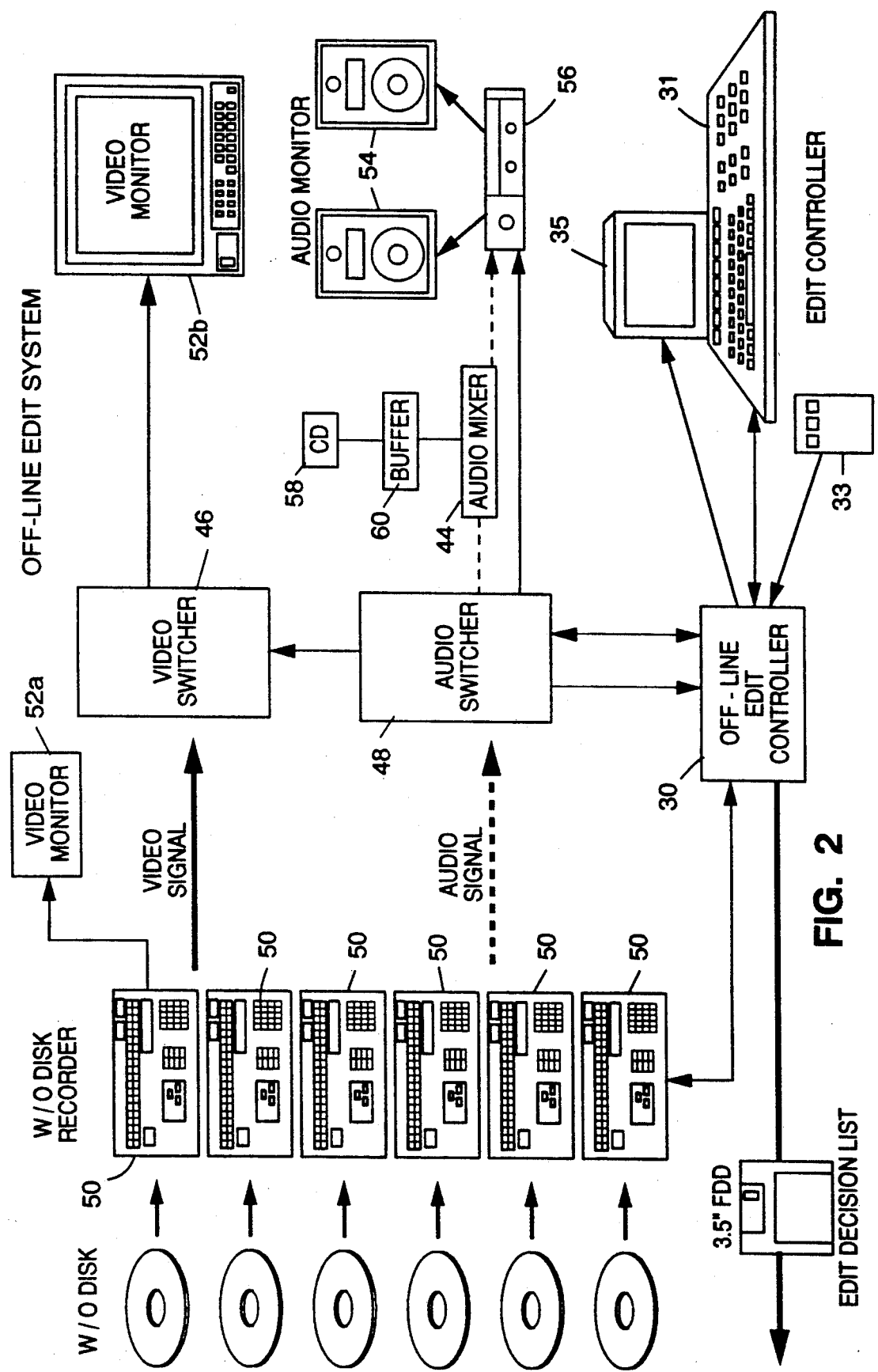
FIG. 2 is a schematic diagram of a preferred embodiment of the invention.

In the preferred embodiment of FIGS. 2-7, the invention includes a programmed computer 30 (including offline editing control hardware and software) for generating the edit list in the form of a computer file (so that the edit list may be written by computer 30, for example, on a 3.5 floppy diskette, as indicated in FIG. 2).

The user interfaces with computer 30 using computer monitor 35, mouse 33, and computer keyboard 31. Computer 30 controls up to six laser video disk units 50, with each of units 50 preferably including a means 50b (shown in FIGS. 4 and 5) for playing a laser video disk (on which unedited takes may be stored) and a means 50a for writing once on a laser disk (for example, to record selected takes being played by other ones of units 50). Sony LVR-5000 and LVS-5000 video disk units are suitable for use as means 50b and 50a, respectively.

Figure 4:
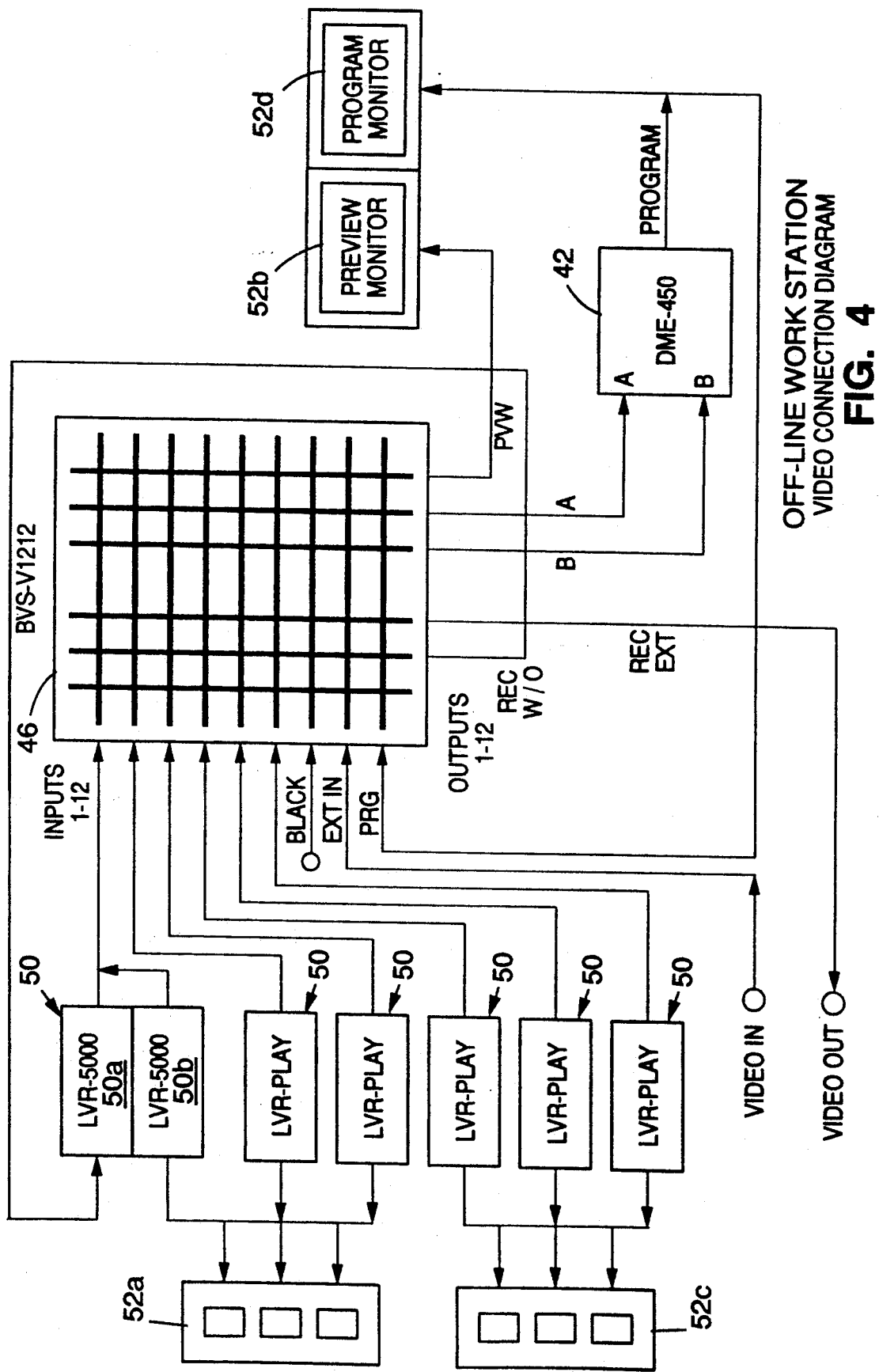
FIG. 4 is a block diagram of a portion of the FIG. 1 system, showing hardware connections for video signals.

The video signals output from units 50 are routed to one or more video monitors 52a, and through video switcher 46, operating under the control of programmed computer 30, to one or more video monitors 52b. Only one monitor 52a and one monitor 52b is shown in FIG. 2 for simplicity, but a total of eight video monitors (52a, 52b, 52c, and 52d) are shown in FIG. 4. A Sony BVS-V1212 video routing switcher is suitable for use as switcher 46.

The audio signals output from units 50 (typically a left and right audio channel for each unit 50) are routed through audio switcher 48, operating under the control of programmed computer 30, to stereo amplifier 56 and speakers 54. An additional audio signal (for special effects) is output from audio CD player 58, through buffer 60 to audio mixer 44, in which it may be mixed with desired signals from unit 48 before amplification in amplifier 56. A Sony BVS-A1201 audio routing switcher is suitable for use as switcher 48.

Figure 3:
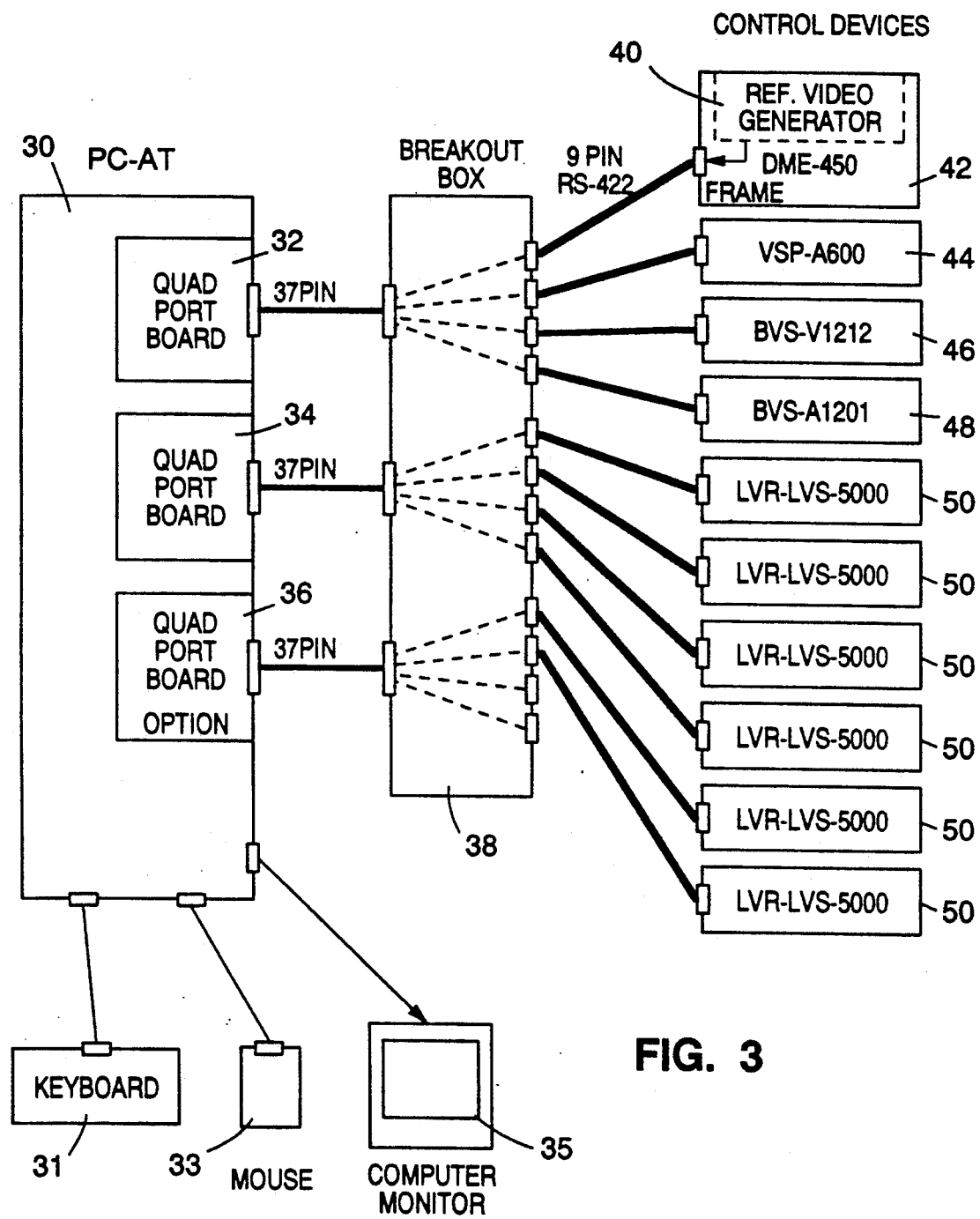
FIG. 3 is a block diagram of a portion of the FIG. 1 system, showing hardware connections for control signals.

With reference to FIG. 3, programmed computer 30 communicated with video special effects unit 42 (which includes video signal generator 40), audio mixer 44, switchers 46 and 48, and video disk units 50, through "quad port" boards 32, 34, and 36, and breakout circuit 38. Unit 42 is not shown in FIG. 2 for simplicity.

Preferably, computer 30 is an IBM AT personal computer (or a compatible "AT" computer), and each of boards 32, 34, and 36 is connected within a standard IBM AT slot of the computer. The function of circuits 32, 34, 36, and 38 is to enable computer 30 to control up to twelve peripheral devices through three un-modified slots of the computer. Circuit 38 includes twelve 9-pin RS-422 ports, for connection to the twelve peripheral devices shown in FIG. 3. Four such RS-422 ports are connected to each of the three 37-pin ports of box 38, and each such 37-pin port is connected to a different 37-pin port of board 32, 34, or 36.

A frame reference signal from video signal generator 40 (which may be a Sony Model BVS-3200 signal generator) will cause an interrupt to computer 30 through quad port board 32, to synchronize the communication for device control to video frame time.

Video special effects unit 42 (which may be a Sony DME-450 digital multi effects device) should be capable of processing the stored takes to simulate various video signal transitions between edits (such as dissolves, fades, and wipes), to enable the user to view shows defined by edit lists which specify such video signal transitions.

Similarly, audio mixing unit 44 (which may be a Sony VSP-A600 audio mixing device) should be capable of generating audio signal transitions such as audio crossfades, to enable the user to listen to the audio track of shows defined by edit lists which specify such audio transitions.

With reference to FIG. 4, the video playback output of each of the upper three video disk units 50 is connected to a different video monitor within group 52a of video monitors, and the playback output of each of the lower three video disk units 50 is connected to a different video monitor within group 52c of video monitors. The playback output of each video disk unit 50 is also connected to an input of video switcher 46. An output of switcher 46 is also connected to video disk recording unit 50a within the top unit 50, so that the video output of switcher 46 may be recorded on a disk within unit 50a. One or more of the other units 50 may also include a recording unit, connected to switcher 46 in the same way as is the top unit 50.

Two outputs of switcher 46 are connected to the inputs of video special effects unit 42, whose output is connected to video monitor 52d and to an input of switcher 46. Another output of switcher 46 is connected to video monitor 52b.

Figure 5:
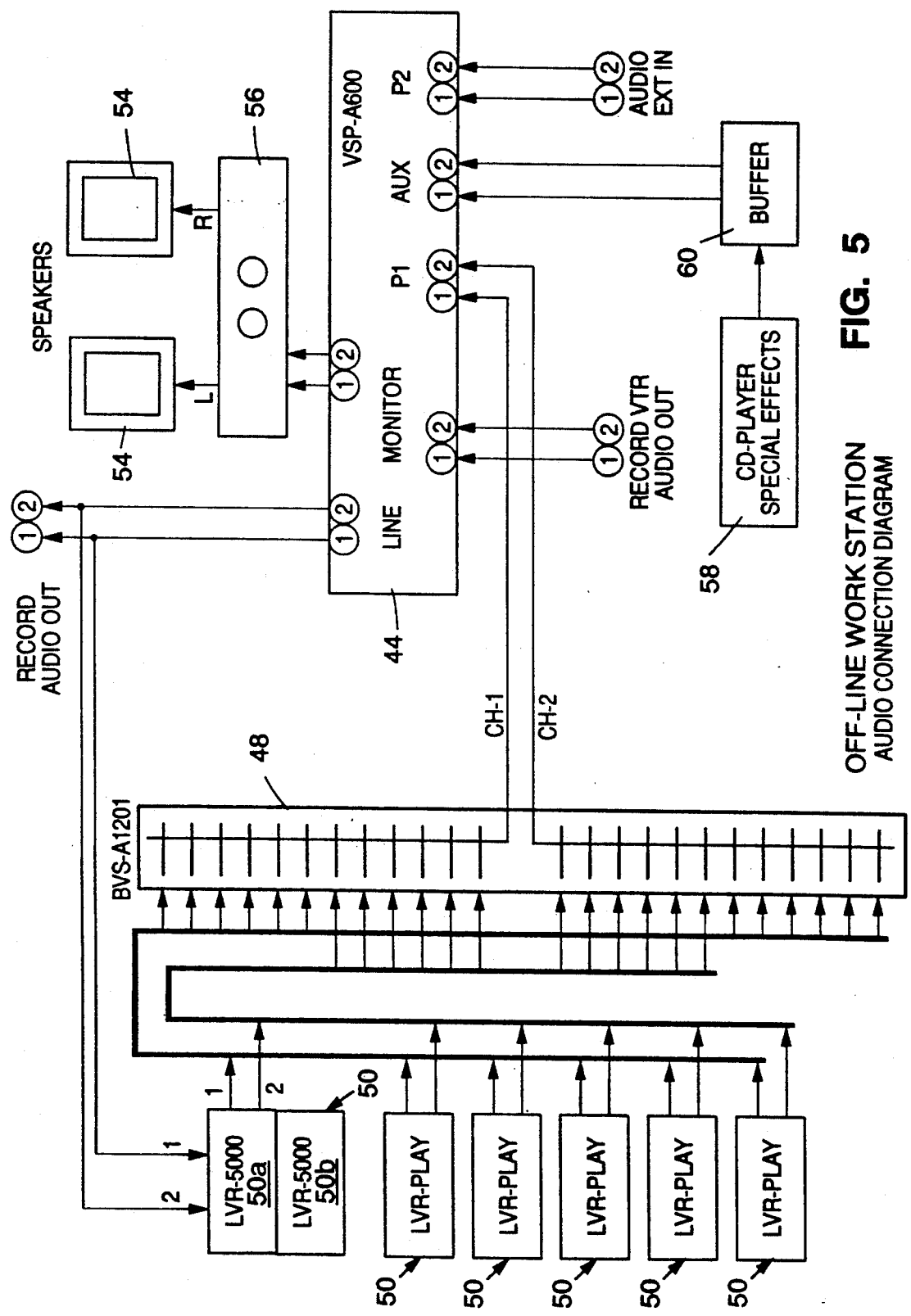
FIG. 5 is a block diagram of a portion of the FIG. 1 system, showing hardware connections for audio signals.

With reference to FIG. 5, the audio playback output (including a left and a right audio channel) of each of the upper three video disk units 50 is connected to an input of audio switcher 48. The line output of audio mixing unit 44 is also connected to the left and right inputs of recording unit 50a within the top unit 50, so that the audio output of mixing unit 44 may be recorded on a disk within unit 50a.

The output of audio CD player 58 is supplied through buffer 60 to left and right inputs of mixing unit 44, so that such audio signals may be mixed with audio signals from switcher 48. The left and right outputs of mixing unit 44 are connected to audio amplifier 56, and the amplified left and right audio channels are sent to pair of speakers 54.

Figure 6:
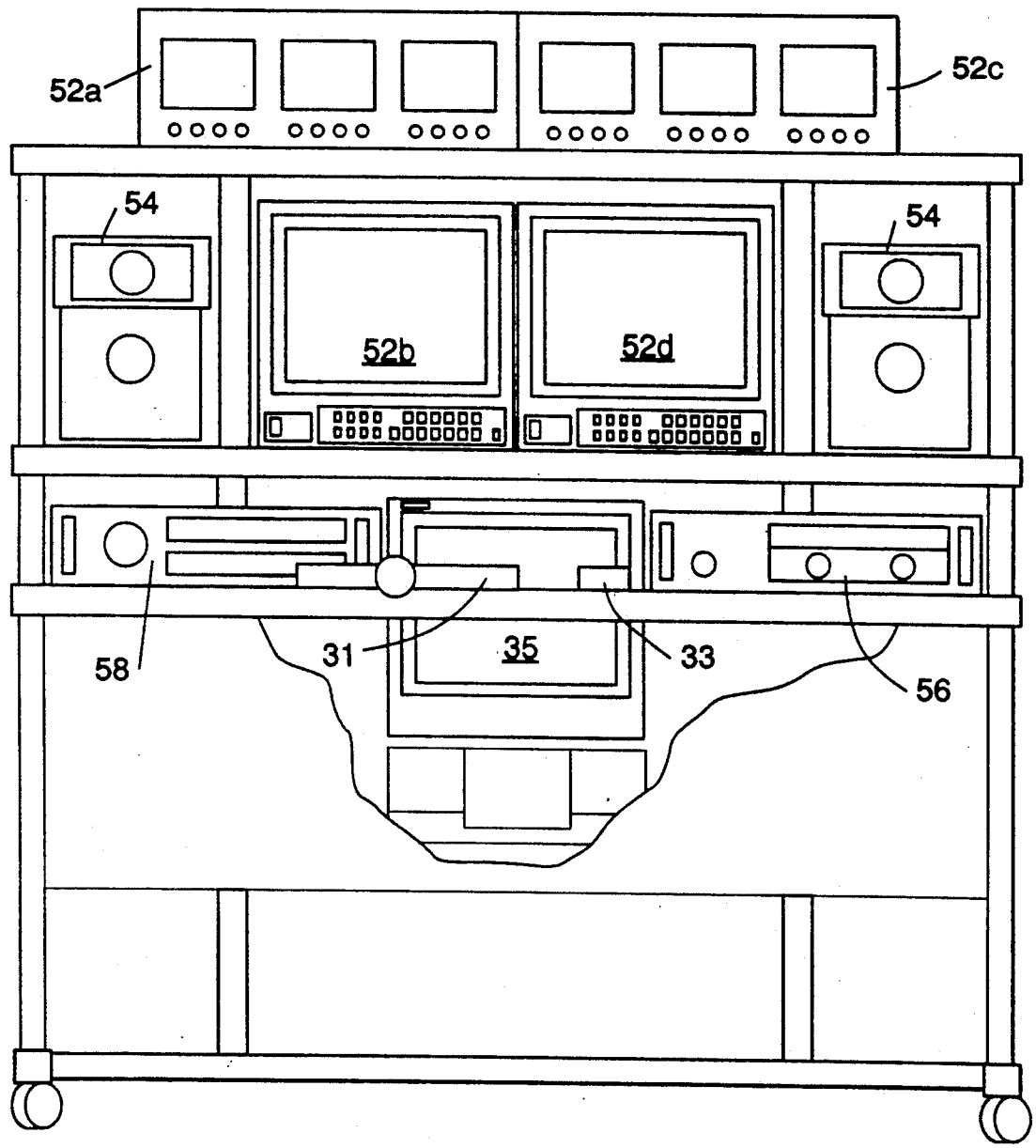
FIG. 6 is a front view of a console portion of the FIG. 1 system.

Preferably, video monitors 52a, 52b, 52c, and 52d, computer monitor 35, audio speakers 54, audio amplifier 56, CD player 58, computer keyboard 31, and mouse 33 are mounted on a console rack as shown in FIG. 6. With the arrangement of FIG. 6, a user may conveniently view the video monitors (and thus focus his or her attention on the frames being displayed), while manipulating the mouse in order to enter edit decisions into the system. At other times during the editing process, a user may conveniently view the computer monitor while typing computer commands using the keyboard or entering computer commands using the mouse.

Figure 7:
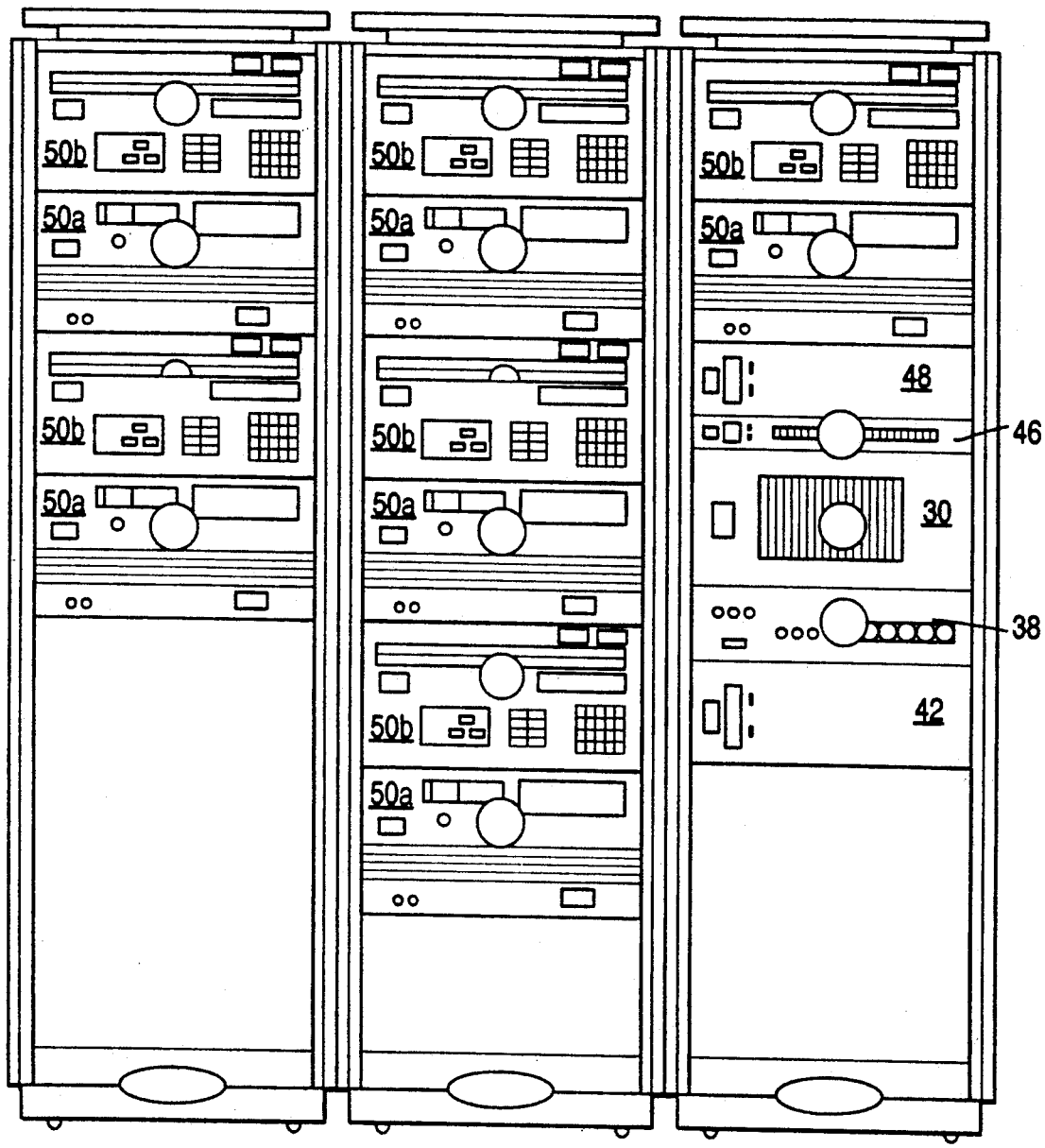
FIG. 7 is a front view of an equipment rack portion of the FIG. 1 system.

Preferably also, six video disk units 50 (each including a laser video disk recorder 50a and a player 50b), programmed computer 30, breakout box 38, video special effects unit 42, video switcher 46, and audio switcher 48, are mounted on an equipment rack portion as shown in FIG. 7.

Figure 8:
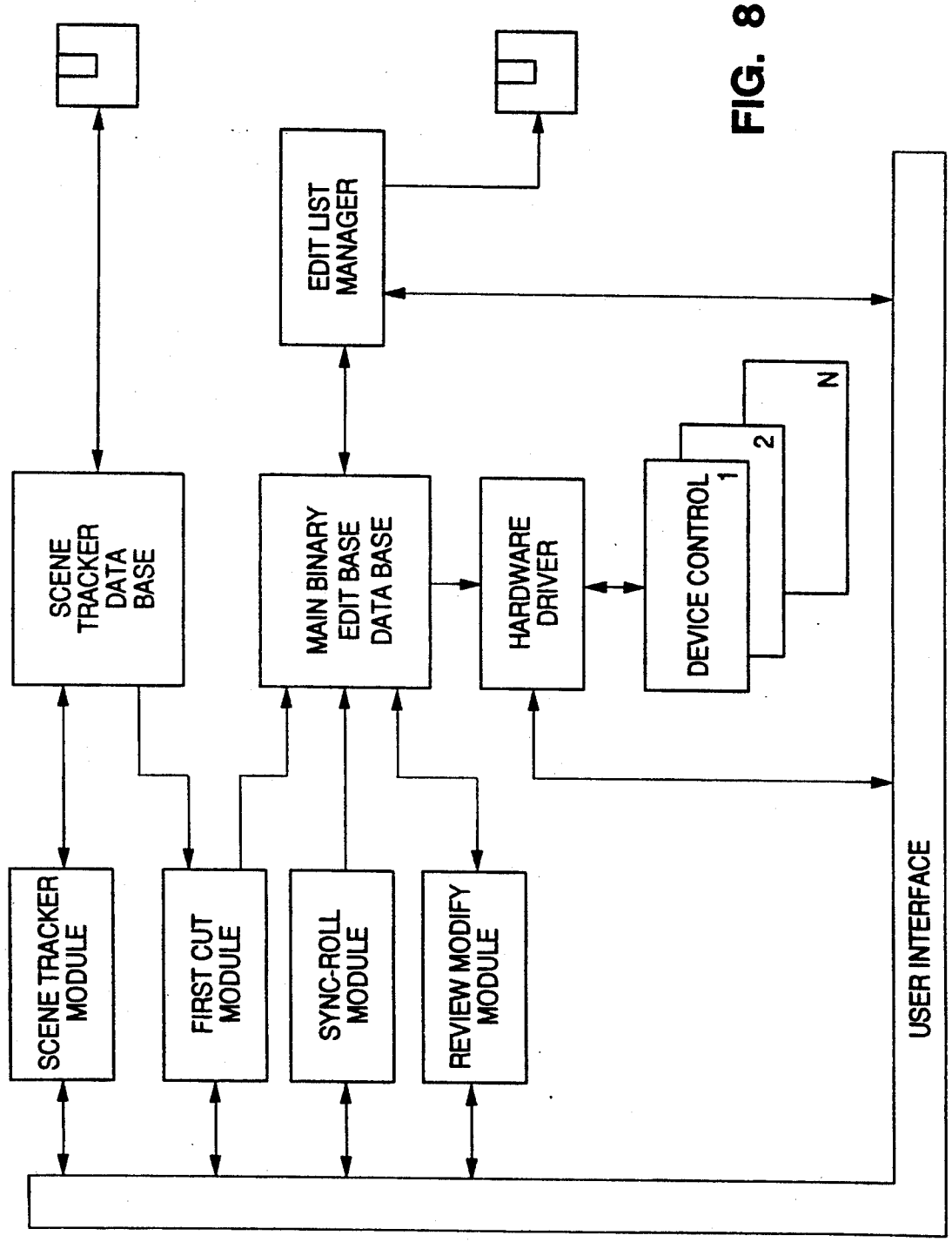
FIG. 8 is a diagram representing the functionality of the software of the invention.
Figure 9:
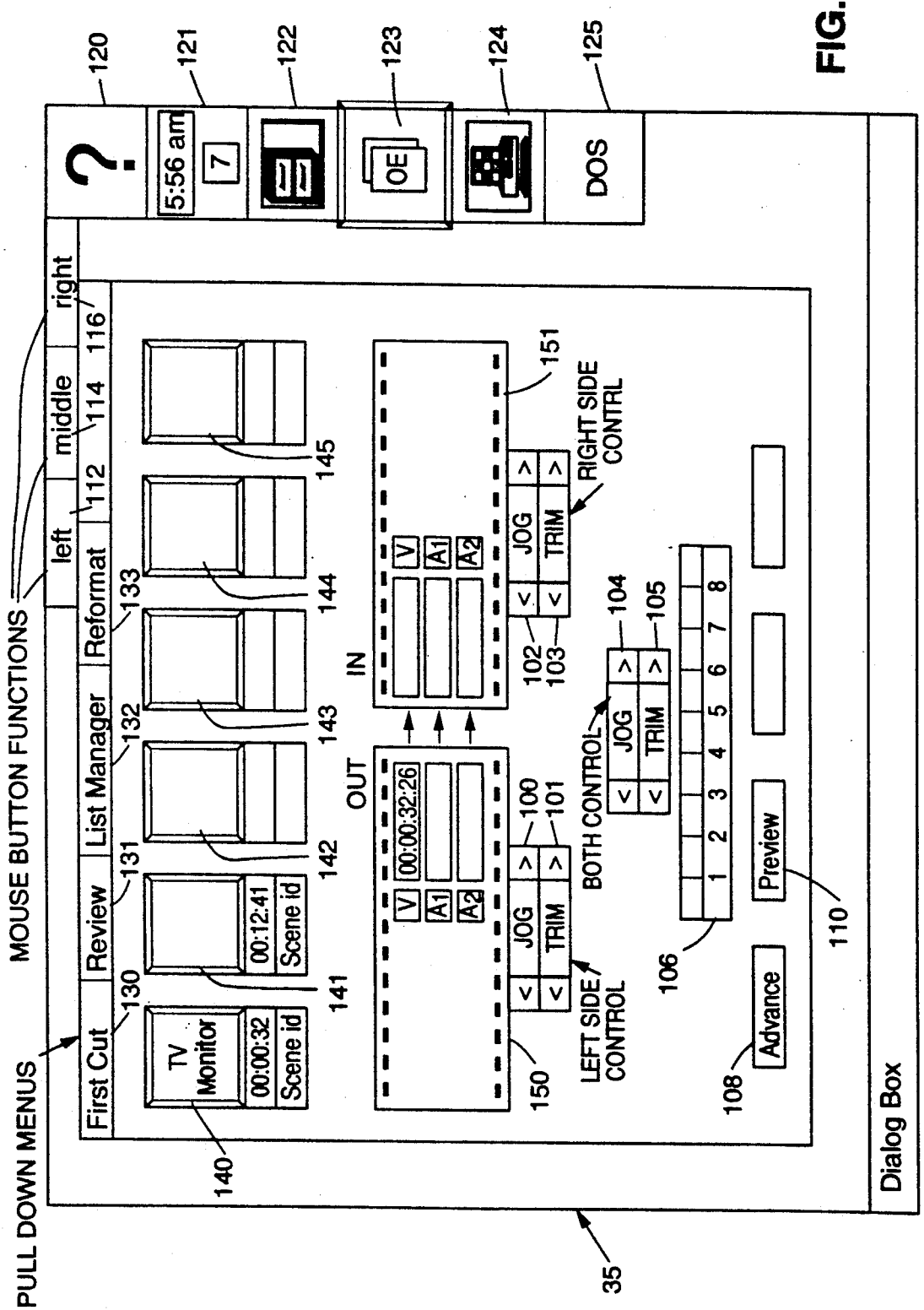
FIG. 9 is a typical display produced by the user interface of the invention on the computer monitor of the invention.

With reference to FIG. 8, programmed computer 30 includes: hardware driver software for controlling the video and audio peripheral devices of the system (including device control routines for each type of peripheral device employed in the system); scene tracker software (enabling the user conveniently to log unedited takes into the system, and generate lists of logged takes); edit decision software; and user interface software, which is capable of accessing the other system software in response to commands entered by the user using mouse 33 or keyboard 31 and is capable of generating displays of the type shown in FIG. 9 on computer monitor 35's screen.

The scene tracker software enables the user conveniently to log unedited takes into the system in either of two ways (depending on whether the unedited takes are stored on videotape or on video disks). First, if the user starts with video tape versions of the unedited takes, the scene tracker module allows the user to cue individual videotaped takes (when video tape players have been connected to the system to play back the takes), mark "in" and "out" frames of the takes being played back, and copy the marked takes onto a video disk (storing not only the first and last frame time codes of the original videotaped version of each copied take but also the first and last frame time codes of the new video disk version each copied take). Alternatively, when the user starts with video disk versions of the unedited takes, the scene tracker module prompts the user to mark "in" and "out" frames of desired ones of the takes, and stores the "in" and "out" (first and last) frame time codes of each marked take (i.e., the scene tracker module logs the marked takes).

The scene tracker module also prompts the user to enter descriptions of logged takes (using computer keyboard 31), and stores the user-entered descriptions. Additionally, the scene tracker module allows the user to revise the descriptions of the logged takes, and to add or delete selected takes to the scene tracker data base (which data base includes the addresses and descriptions of the logged takes).

The edit decision software includes the "first cut" module, "sync-roll" module, "review modify" module, and "edit list manager" module shown in FIG. 8.

The first cut module enables the user conveniently to generate an edit list from logged, unedited takes. The edit list includes time codes identifying the splices between edits on the list, codes identifying the type of each splice (i.e., wipe, dissolve, fade, or simple cut), and user-entered descriptions of the edits on the list.

The "review modify" module enables the user to revise an already-generated edit list (while viewing selected video takes), and to view a show defined by an already-generated edit list (i.e., to cause the video tape players to simulate the show by sequentially playing back the edits on the edit list).

The sync-roll module enables the user to view simultaneously a set of synchronized takes (i.e., takes produced by a number of synchronized cameras) on a number of video monitors, while marking "in" and "out" frames of desired ones of the takes to generate and edit list.

The edit list manager module displays text prompts for prompting the user to manipulate already-generated edit lists (for example by changing the description of an edit or block of edits on the list, or by copying a sequence of edits to another location on the edit list).

Within the first cut module, and each of the other modules described with reference to FIG. 8, are user-selectable subroutines (also denoted herein as "modules") to be described below with reference to FIG. 9.

The user interface software provides an integrated software environment in which the user has global access to a variety of video post production environments, including the scene tracker, first cut, sync-roll, review modify, and edit list manager modules described above. Specifically, the user interface displays user-selectable icons and mnemonic text (representing software modules) enabling the user to access a desired software module (in which a full-screen or pull down menu may be displayed) at any stage during an offline editing operation. The icons (or windows including text) may be selected by the user using a mouse.

FIG. 9 is a typical display generated by the system's user interface software during operation of the system of the invention. Global icons appear in the upper right area of the screen. The user may command the system to execute a software application module of the inventive software by actuating a mouse to select the icon corresponding to the module. For example, the user may select icon 120 (a graphic representation of a question mark) to execute a "help" module; icon 121 to command the system to display the current data and time; icon 122 (a perspective view of a file cabinet, with drawers for containing project files) to execute a "project selection" module in which the system displays a menu including a list of previously created editing project files; icon 123 (a perspective view of a stack of papers with the initials "OE" on the first paper in the stack) to execute a module enabling the user to select one of the modules described above with reference to FIG. 8 (and thus to reconfigure the display screen); icon 124 (a perspective view of a video special effects device resembling the Sony DME-450 digital multi effects device) to execute a "special effects" module (in which the system displays a menu enabling the user to control a digital special effects device to simulate desired transitions between user-specified frames); and icon 125 to access the computer's operating system.

Upon moving a displayed cursor onto an icon using mouse 33, the icon will become highlighted (as is icon 123 in FIG. 9). The user may select a highlighted icon by "clicking" one of the buttons on the mouse (three such buttons are shown in FIG. 2).

Mnemonic text appears in windows along the top and bottom edges of the screen, such as windows 108 and 110. The user may command the system to execute an application module by actuating a mouse to select the text window corresponding to the module. For example, the user may select text 108 ("Advance") to command the system to add the left edit (the edit whose time codes are currently displayed in window 150, and have been marked) to the edit list, move the right edit (the edit whose time codes are currently displayed in window 151, and have been marked) to left monitor 52b (and the move the displayed information from window 151 to window 150), and move the next edit (if any) on the edit list to right monitor 52d (and display the "in" time codes for such next edit in window 151).

For another example, upon selection of text 110 ("Preview") the system will play (display on video monitor 52b) the last five seconds of the current left edit through the end of the current right edit. For another example, upon selection of "reformat" text window 133 along the top edge (immediately to the right of "edit list manager" window 132), the system might prompt the user to modify the position of the displayed windows and icons.

The user may cue a take in a variety of ways. For example, the user may select a video disk player and enter a desired time code (typically after accessing the scene tracker module to display a list of logged takes), and specify whether the take is to be the left or right edit. The time codes of the current left edit (for the video, left audio, and right audio channels) are displayed in window 150 (labeled "out") Similarly, time codes of the current right edit are displayed in window 151 (labeled "in"). Also in response to such cuing commands, the system's hardware driver software will physically prepare the disk to play back the selected take (for example, on left monitor 52b for a left edit, or on right monitor 52d for a right edit, as well as on the one of monitors 52a or 52c which corresponds to the selected disk player).

Alternatively, the user may select a video disk player and enter a project identification code (a code identifying an already-generated edit list). In this case, the system will cue the selected player to the beginning of the first edit on the identified edit list, display the time codes of this first edit in the "in" window, and display the first edit (as a right edit) on right monitor 52d.

Alternatively, the use may enter a project identification code (a code identifying an already-generated edit list). In this case, the system will cue the nearest disk player to the beginning of the first edit on the identified edit list, display the time codes of this first edit in the "in" window, and display the first edit (as a right edit) on right monitor 52d.

Additional application modules may be selected by choosing appropriate windows including icons or mnemonic text on the display screen, although not all such windows are shown in FIG. 9, for simplicity. Additional modules allowing the user to view selected edits (or edit sequences) include:

"Replay," in which the system starts at the beginning of the left edit and plays through the rest of the edits on an edit list;

"Restart," in which the system starts at a user-specified restart limit (time code) and plays through the rest of the edits on an edit list up to a second user-specified restart limit;

"Restart Limits," in which the system stores user-specified restart limits (time codes) for use in performing a "Restart" operation;

"Open," in which the system cues a pair of players at a specified splice (so that the user may view the last frame of the left edit juxtaposed with the first frame of the right edit);

"Rock and Roll," in which the system enables the user to view a specified splice at any speed in a forward or reverse direction.

When a laser disk player is cued to a particular frame, a corresponding one of windows 140–145 will display the time code of that frame, and the project identification number (or "scene id," as denoted in FIG. 9) identifying an edit list including the edit to which the frame belongs. It is contemplated that in a variation on the embodiment of FIGS. 2–7, monitors 52a and 52c will be deleted, and replaced by a means for displaying each cued frame in a picture-in-picture video window at one of locations 140–145 of the computer screen. In such variation, if a frame with SMPTE time code 00:00:32 is cued on a first of video disk players 50, that frame would be displayed in the "first" picture-in-picture window (window 140 in FIG. 9).

Additional modules allowing the user to mark edits include:

"Out," in which the system marks the time code of all three of the video, left audio, and right audio channels of the currently cued left edit (i.e., the three time codes currently identified in window 150);

"In," in which the system marks the time code of all three of the video, left audio, and right audio channels of the currently cued right edit (i.e., the three time codes currently identified in window 151);

"Edit," in which the system performs both the "In" and "Out" function;

"V," "A1," "A2," "VA1," "VA2," A1A2," in which the system marks the time code of the current left edit and the time code of the current right edit for the indicated channels (i.e., for the video channel and the left audio channel in the case of module "VA1"); and "Trim," in which the system adds or subtracts a user-specified number of frames to or from specified channels on specified sides of a splice (the user may specify the left side of the splice by operating the mouse to select Trim icon 101, the right side of the splice by operating the mouse to select Trim icon 103, and both sides of the splice by operating the mouse to select Trim icon 105).

Additional modules allowing the user to end processing of a splice include:

"Advance" (described above with reference to window 108);

"Reset," in which the system will undo the most recent "Advance" operation);

"Store," in which the system will store the current edit list on a floppy diskette (or hard disk).

Additional modules allowing the user to modify edits about a selected splice include:

"Overlay" (after selecting this module, to overlay a video or audio edit on a specified left edit, the user specifies the overlay signal source, a begin time code within the left edit, a begin time code from the overlay source, and an end time code from either the left edit or the overlay source);

"Insert" (after selecting this module, to add a video or audio edit to the edit list at a point within a left edit, the user specifies a target time code within the left edit, the insert signal source, a begin time code from the insert source, and an end time code from the insert source); and "Delete" (after selecting this module, to delete a video or audio channel from a right edit, the user simply enters the channel to be deleted).

As mentioned above, video special effects unit 42 is provided to process selected takes to simulate special video transitions between edits (such as dissolves, fades, and wipes). If no special transitions are specified, the edit list will designate a simple "cut" splice between each pair of edits. On the other hand, the system allows the user to identify "special effects"splices on the edit list (so that for example, the edit list might specify that the second splice is a linear dissolve with a duration of "X" frames). The system software includes a special effects module (actuated by selecting icon 124) enabling the user to control unit 42, in order to view a show defined by an edit list which specifies such transitions. This special effects module will preferably include the following user-selectable modules:

"Dissolve," to command the system to simulate a dissolve of specified type upon playback of the edited show;

"Wipe," to command the system to simulate a wipe of specified type upon playback of the edited show;

"Fade," to command the system to simulate a fade of specified type upon playback of the edited show; and "Effects," in which the system prompts the user to select effects board options.

In a preferred embodiment, the system displays a graphical representation of the current edit list in window 106. In such representation, each splice is represented by a vertical bar (or the like), which may optionally be identified by a reference numeral. For example, in FIG. 9, eight bars, identified by reference numerals one through eight, are displayed in window 106 to indicate that the current edit list includes nine takes separated by eight splices. Preferably, when frames from adjacent edits on the edit list are identified in windows 150 and 151, the system will automatically highlight the vertical bar in window 106 corresponding to the splice between these two edits.

Upon selection of certain windows (i.e., first cut module window 130, review modify module window 131, edit list manager module window 132, and reformat window 133), the system will display a pull down menu to prompt the user to take further action.

In certain modules, specifically defined functions are displayed in windows 112, 114, and 116. Such functions may be selected by actuating, respectively, the left button of mouse 33, the middle button of mouse 33, or the right button of mouse 33 (left, middle, and right buttons are shown on mouse 33 in FIG. 2).

In one important example, the user may conveniently perform a laser video disk jog/shuttle function by operating mouse 33 in the following manner. After the user has positioned the cursor onto a desired one of jog/shuttle windows 100, 102, and 104 using the mouse, the user may actuate the left button to cue the disk player back by one frame (to the previous frame), or the right button to cue the disk player ahead by one frame (to the next frame).

In this situation, if the user actuates the middle button, the system interprets motion of the mouse in the following manner. As long as the user moves the mouse toward the left, the system will continuously cue the disk player in the reverse direction (to earlier frames). As long as the user moves the mouse toward the right, the system will continuously cue the disk player in the forward direction (to later frames). While in this "shuttle" mode, the user may exit the shuttle mode by actuating the right button, and may actuate various combinations of the left and middle buttons to command the system to change the speed or direction in which the disk player shuttles. In the shuttle mode (as in other modes), mnemonic text representing the mouse button functions will preferably be displayed in windows 112, 114, and 116.

For example, in the shuttle mode, actuation of the middle button might command the system to increase the shuttling speed, actuation of the left button might command the system to decrease the shuttling speed, and simultaneous actuation of the left and middle buttons might command the system to reverse the direction of shuttling.

If window 100 is selected, the jog and/or shuttle function of the "left" laser disk player (the laser disk player on which the frame identified in window 150 is cued) is enabled. If window 102 is selected, the jog and/or shuttle function of the "right" laser disk player (the laser disk player on which the frame identified in window 151 is cued) is enabled. If window 104 is selected, the jog and/or shuttle functions of both the right and left laser disk players are enabled.

Figure 10:
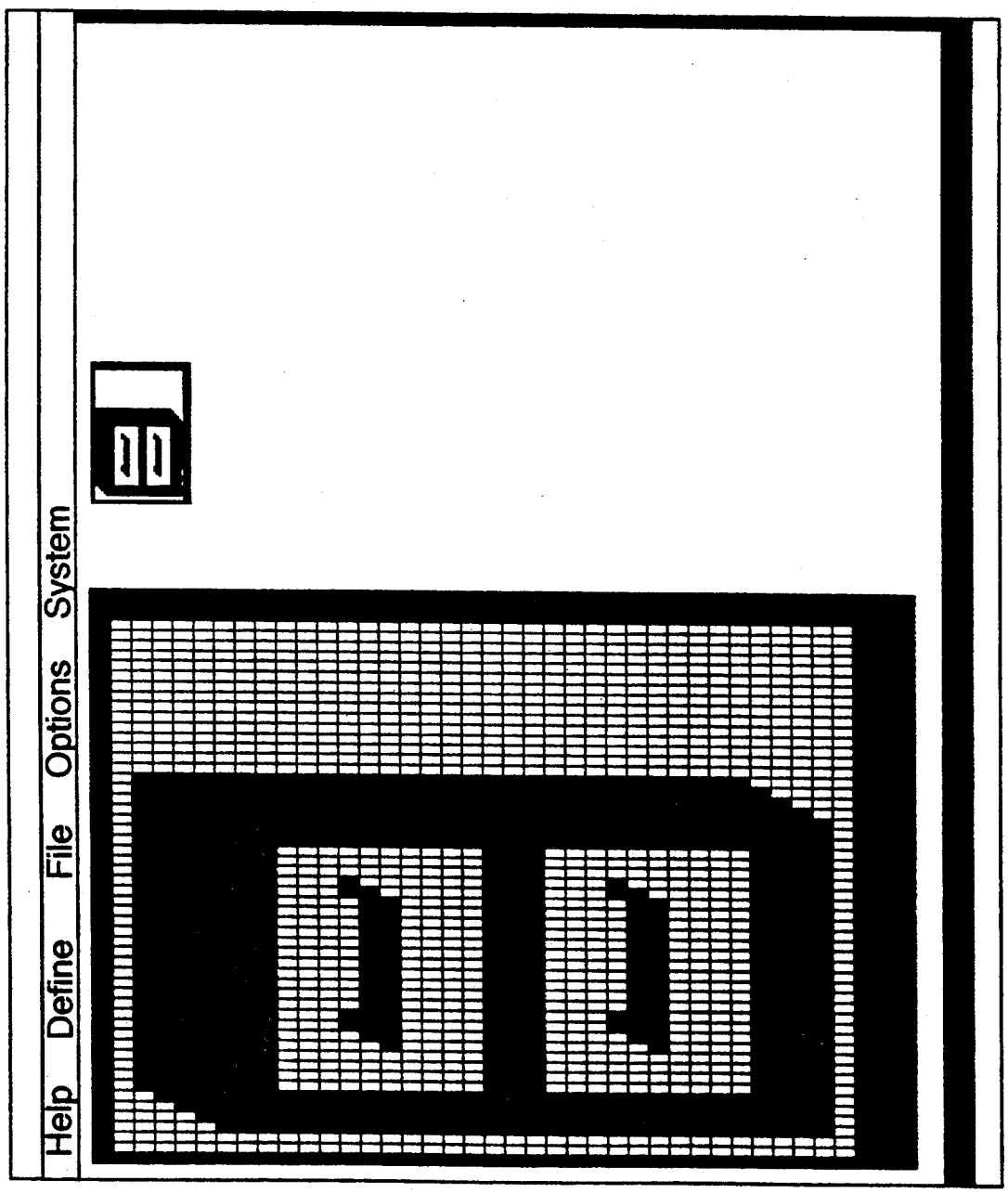
FIG. 10 is a display on the computer monitor of the invention, which includes an enlarged view of an icon shown in FIG. 9, and a non-enlarged view of the icon.
Figure 11:
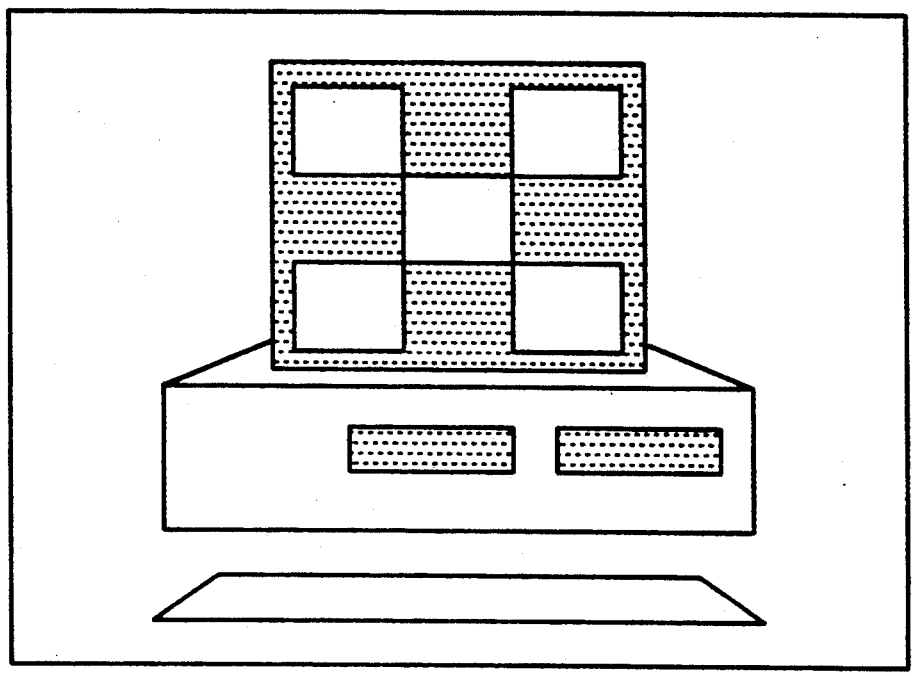
FIG. 11 is an icon of the type shown in simplified form in FIG. 9.

FIG. 10 shows two versions of icon 122 shown in FIG. 9, including an enlarged view (on the left) and a non-enlarged view (on the right). FIG. 11 is a more detailed, enlarged version of icon 124, which is shown in simplified form in FIG. 9.

Figure 12:
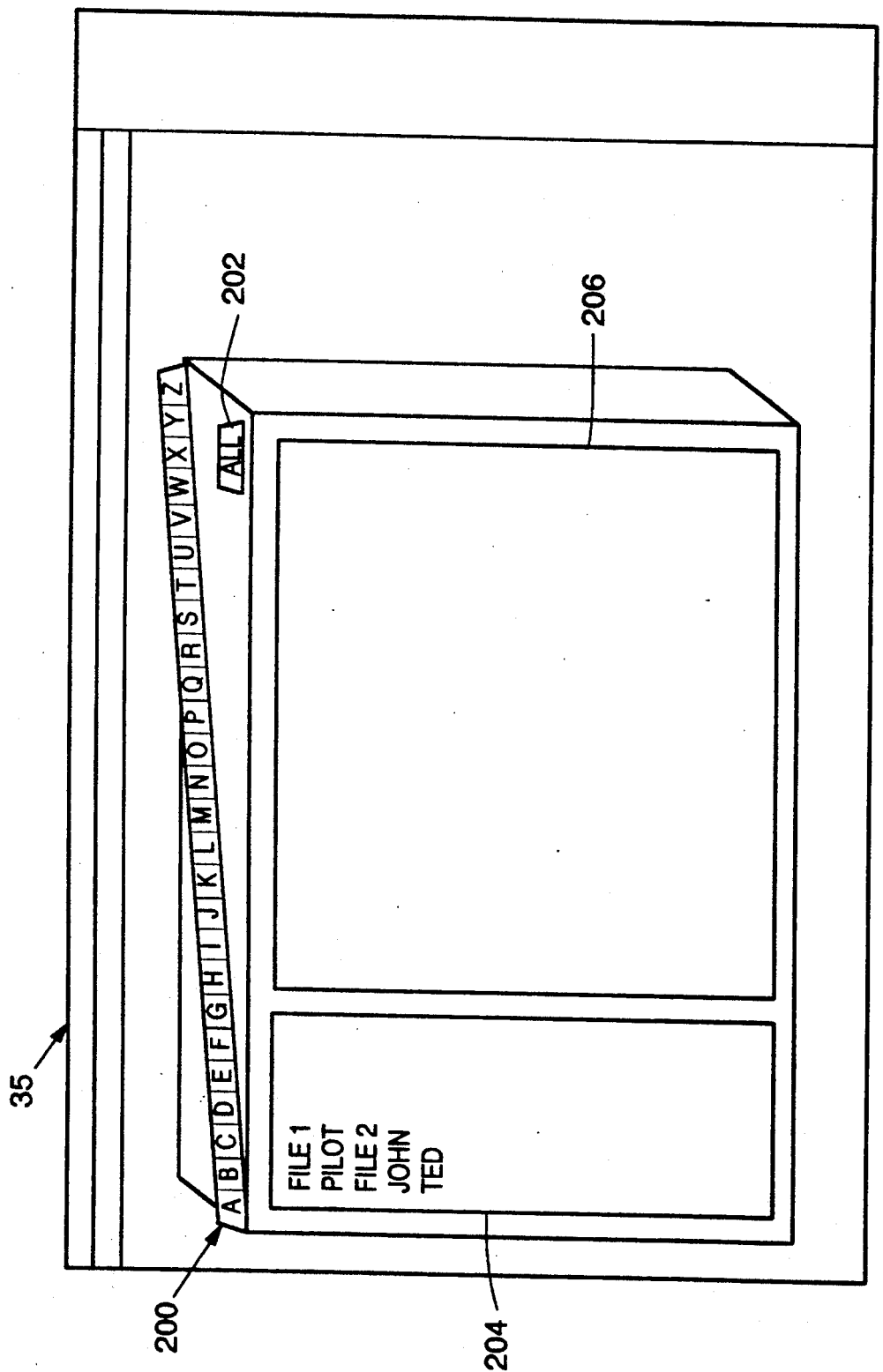
FIG. 12 is a display on the computer monitor of the invention, of the type produced by the project selection module of the invention.

FIG. 12 is a typical display produced on monitor 35's screen upon selection of the project selection module of the invention (i.e., upon selection of icon 122 shown in FIG. 9). The "project folder" display of FIG. 12 includes alphabetically arranged "file" icons 200 and 202. Each of icons 200 represents a different letter of the alphabet, and icon 202 represents all letters of the alphabet. Upon selection of any of the file icons 200 and 202 using a mouse, the system will display a pulldown menu listing all computer files having names beginning with the corresponding letter (or letters) of the alphabet. The user may then select any desired file from the list on the pulldown menu. Even without selection of one of icons 200 and 202, a list of files will appear in window 204. By entering appropriate mouse commands, additional information regarding any of the files in window 204 will be displayed in window 206.

Figure 13:
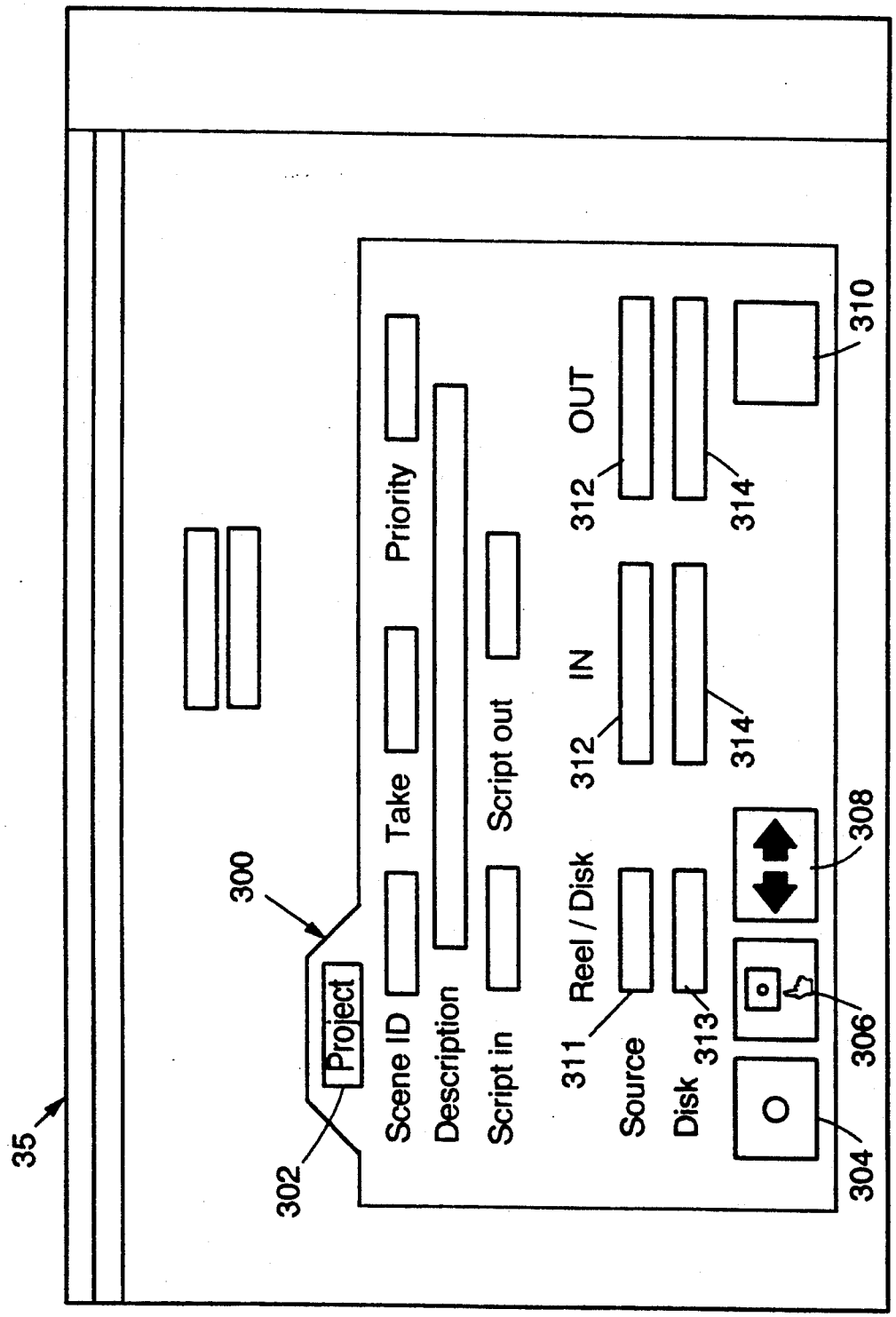
FIG. 13 is a display on the computer monitor of the invention, of the type produced by the scene tracker module of the invention.

FIG. 13 is a typical display produced on monitor 35's screen upon selection of the scene tracker module of the invention. "Index card" display 300 in FIG. 13 includes a window 302 for displaying a file name identifying the computer file in which the scene tracking information being entered by the user will be stored. While viewing takes (stored in videotape or laser video disk form), the scene tracker software displays (in windows 312) "in" and "out" frame time codes of the takes being viewed (i.e., time codes from the source tape or source video disk identified in window 311), and also displays (in windows 314) in and out frame time codes of video disk locations (of the disk identified in window 313) into which the user may choose to copy such takes. The "index card" display of FIG. 13 also provides additional windows in which the user may conveniently type information describing the take identified by time codes in windows 312 and 314. The display of FIG. 13 also includes icon windows 304, 306, 308, and 310, which may be selected by the user to perform various scene logging operations. For example, selection of icon 308 may instruct the system to display all information regarding another take that has previously been logged into the system (so that the user may revise previously-entered descriptive information regarding that take).

It is contemplated that the system may include random access memory units other than laser video disk players for storing the video and audio signals which comprise the unedited takes. For example, the takes may be digitized and stored in magnetic disk drives.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. An offline editing system, including:
   random access storage means, including a first video disk player and a second video disk player, for storing unedited video takes, wherein each of the takes comprises a number of frames;
   display means connected to the storage means for displaying selected frames of the stored takes;
   a programmed computer, including user interface means for providing a user with global access to a number of video post production environments at any time offline editing operation of the offline editing system, and edit list generation means for generating an edit list in response to user-entered commands, wherein the user interface means includes means for controlling the storage means in response to the commands and means for controlling operation of the edit list generation means in response to the commands;
   a mouse connected to the computer for asserting the commands to the computer; and
   a computer monitor connected to the computer and having a screen, wherein the user interface means includes a disk player jog/shuttle means including
   means for displaying a first jog/shuttle window on the screen and a second jog/shuttle window on the screen;
   means for controlling the first video disk player in response to a first selection command and subsequent control commands from the mouse; and
   means for controlling the second video disk player in response to a second selection command and subsequent control commands from the mouse, wherein the first selection command selects the first jog/shuttle window and the second selection command selects the second jog/shuttle window.

2. The system of claim 1, wherein the mouse includes a plurality of buttons, and wherein the disk player jog/shuttle means includes:
   jog means for implementing a first mode of operation of the first video disk player in response to the first selection command, wherein in the first mode, the job means cues the first video disk player back by one frame in response to actuation of a first one of the buttons, and wherein in the first mode, the jog means cues the first video disk player ahead by one frame in response to actuation of a second one of the buttons.

3. The system of claim 2, wherein the disk player jog/shuttle means includes:
   shuttle means for terminating said first mode and implementing a shuttle mode of operation of the first video disk player in response to actuation of a third one of the buttons, wherein in said shuttle mode, the shuttle means continuously jogs the first video disk player in a forward direction for so long as the user moves the mouse in a first direction, and in said shuttle mode, the shuttle means continuously jogs the first video disk player in a reverse direction for so long as the user moves the mouse in a second direction opposite from the first direction.

4. The system of claim 3, wherein the disk player jog/shuttle means includes:

means for changing the speed with which or the direction in which the first video disk player is continuously jogged, in response to actuation of various combinations of the buttons following said actuation of said third one of the buttons.

5. The system of claim 1, also including:

a video special effects means operating under control of the programmed computer to generate for display, on the display means, video simulations of video transitions between selected ones of the takes.

6. The system of claim 1, wherein the random access storage means is a set of laser video disk players.

7. The system of claim 6, wherein the computer includes a peripheral device control slot, and a means for interfacing between the slot and at least two of the laser video disk players.

8. The system of claim 1, wherein each of the takes includes a video channel, and at least one audio channel.

9. The system of claim 1, wherein the edit list consists of edits separated by splices, and also including:

a video special effects means operating under control of the programmed computer for generating display video simulations of said splices.

10. The system of claim 1, wherein the edit list consists of edits separated by splices, and also including:

an audio mixing unit operating under control of the programmed computer for generating playback audio simulations of said splices.

11. An offline editing system, including:

random access storage means for storing unedited video takes, wherein each of the takes comprises a number of frames;

display means connected to the storage means for displaying selected frames of the stored takes;

a programmed computer, including user interface means for providing a user with global access to a number of video post production environments at any time during offline editing operation of the offline editing system, and edit list generation means for generating an edit list in response to user-entered commands, wherein the user interface means controls operation of the edit list generation means in response to the commands; and a computer monitor connected to the computer and having a screen, wherein the edit list generation means includes means for displaying a graphical representation of the edit list in a window on the screen, wherein the edit list consists of edits separated by splices, and wherein the graphical representation of the edit list includes a graphical element representing each splice.

12. An offline editing system, including:

random access storage means for storing unedited video takes, wherein each of the takes comprises a number of frames;

display means connected to the storage means for displaying selected frames of the stored takes;

a programmed computer including means for controlling the storage means, edit list generation means for generating an edit list in response to user-entered commands, and user interface means for controlling operation of the edit list generation means in response to the commands, said edit generation means including a set of application software modules;

a mouse connected to the computer means for entering the commands to the computer; and a computer monitor having a screen, wherein the user interface means includes means for displaying windows on the screen, where each of the windows includes an icon or mnemonic text which corresponds to one of the application software modules, and wherein the user interface means includes means for enabling a user to select any one of the windows using the mouse to access the corresponding one of the application software modules, wherein the edit list generation means includes means for displaying a graphical representation of the edit list in a window on the screen, wherein the edit list consists of edits separated by splices, and wherein the graphical representation of the edit list includes a graphical element representing each splice.

* * * * *